Oct. 31, 1961 G. F. DRAKE 3,007,054
APPARATUS FOR CONTROLLING PRIME MOVERS
Filed March 12, 1959 2 Sheets-Sheet 1
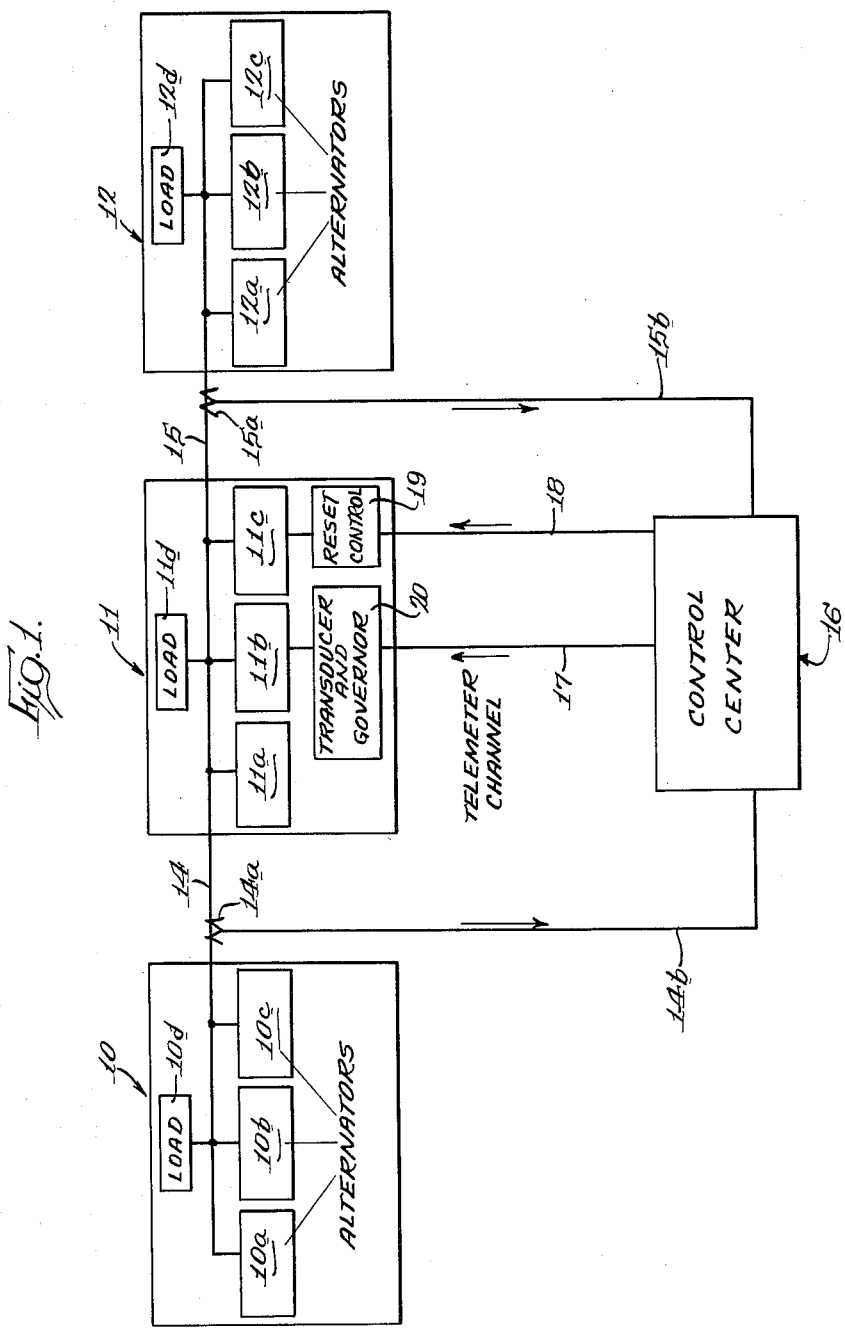
INVENTOR.
George Forrest Drake
BY
Wolfe, Hubbard, Voit & Osann
Attys.

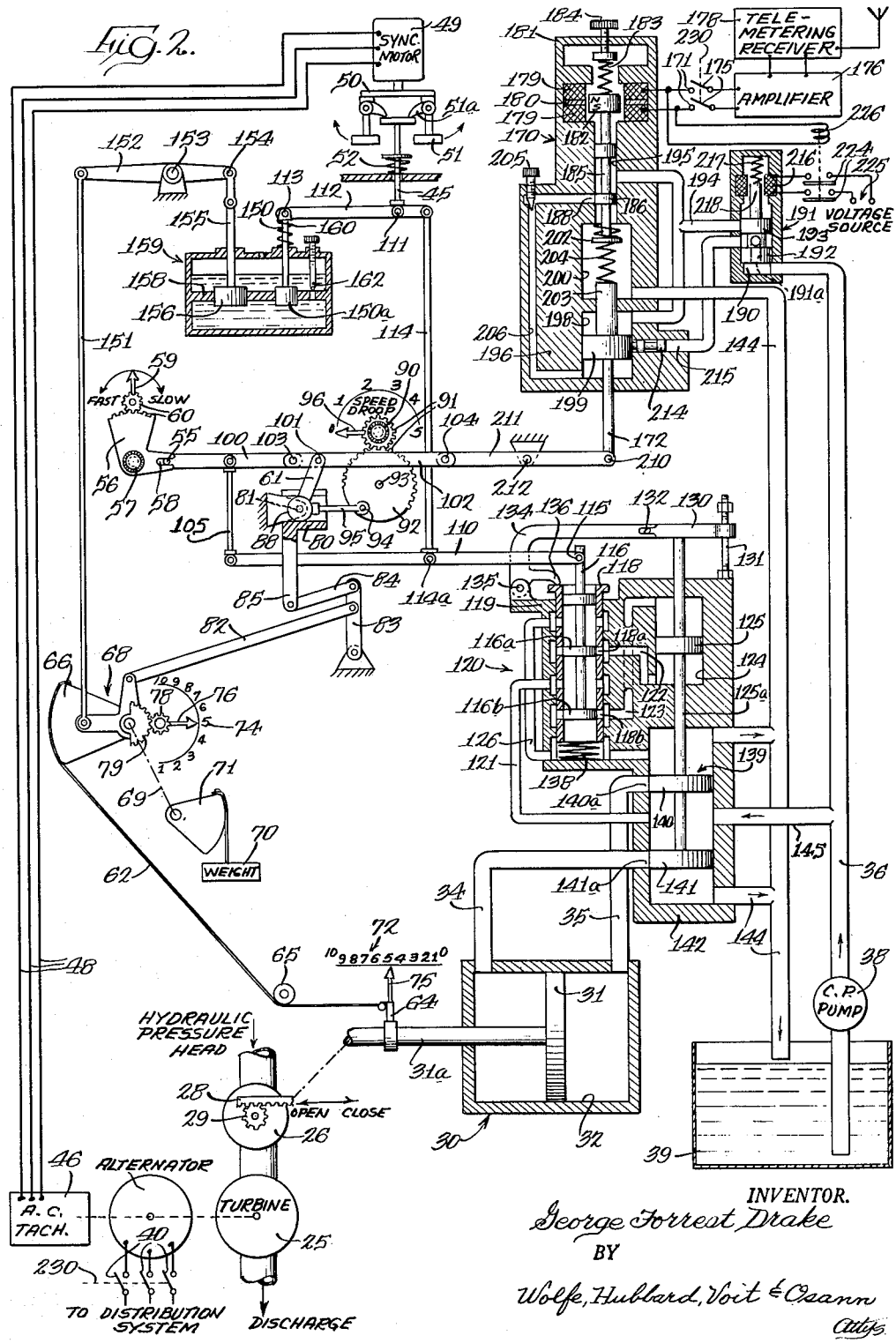

# United States Patent Office 3,007,054
Patented Oct. 31, 1961

3,007,054
APPARATUS FOR CONTROLLING PRIME MOVERS
George Forrest Drake, Rockford, Ill., assignor to Woodward Governor Company, Rockford, Ill., a corporation of Illinois
Filed Mar. 12, 1959, Ser. No. 799,004
14 Claims. (Cl. 290—40)

The present invention relates in general to apparatus for controlling prime movers, and finds advantageous although not exclusive use in controlling both the speed and loading of alternators driven by prime movers and connectable to synchronous electrical distribution systems.

The general aim of the invention is to bring forth an improved governing and control apparatus of a rugged mechanical nature which not only accurately controls the speed of a prime mover driving an alternator when the latter is disconnected from a distribution system, but which also quickly and automatically effects desired changes in the loading of the alternator when the latter is connected to the system, such changes being made in accordance with a variable control signal.

A related object is to provide such a governing device which readily accepts electrical control signals produced by telemetering apparatus and transmissible from remote control centers.

It is a further object to avoid abrupt, undesirable and perhaps harmful changes in the current or load of an alternator driven from a prime mover controlled by a governor which responds to a variable control signal in the event that the control signal is lost due, for example, to communication equipment failure.

Another object is to control prime movers according to a variable control signal quickly to meet demands for load changes, yet to provide for adjustment in the speed of response to a given change in the controlling signal so as to maintain stability and safety. More specifically, in the case where gate valves for a hydraulic turbine are adjusted by a governor mechanism in response to a variable control signal, the invention contemplates easy adjustments to obtain maximum speed of response while avoiding water hammer or other undesirable effects produced by the gate valve being moved too fast.

Still another object of the invention is to provide such an improved speed and load governing apparatus which may be constructed by relatively simple structural additions and modifications to existing governors.

Yet another object is to accomplish the foregoing improvements while retaining the compensating and droop action of an original governor.

Other objects and advantages will become apparent as the following description proceeds, taken in conjunction with the accompanying drawings, in which:

FIGURE 1 is a simplified block diagram of interconnected power systems, illustrating one application of the improved governor apparatus; and FIG. 2 is a schematic illustration of apparatus embodying the features of the present invention.

While the invention has been shown and will be described in some detail with reference to a particular embodiment thereof, there is no intention that it thus be limited to such detail. On the contrary, it is intended here to cover all modifications, alternatives and equivalents falling within the spirit and scope of the invention as defined by the appended claims.

In order to explain an exemplary environment in which the present invention finds advantageous use, reference is made to FIG. 1. As there shown, three power distribution areas 10, 11, 12 are represented in simplified form as comprising respective pluralities of alternators 10a–c, 11a–c, and 12a–c supplying power over distribution lines to changeable loads 10d, 11d and 12d. As is frequently the case with power companies serving adjacent territories, the distribution areas 10–12 are here illustrated as having interconnecting tie lines 14 and 15, so that the three distribution areas in effect become one large integrated system.

It is desired in many instances to maintain the net power interchange between the utility company or area 11 at a substantially steady value despite the fact that the three loads 10d, 11d, 12d may vary relative to one another abruptly and over a wide range. For this purpose, tie line power monitors or transducers 14a and 15a are associated with the tie lines 14 and 15, and connected to transmit signals representing power transfer over telemetering channels 14b, 15b to a control center 16. At the control center, the telemetered signals from the monitors 14a and 15a are algebraically combined and compared to the net tie line transfer power which is desired according to a predetermined program. It may be desired that the area 11 receive more power from the adjacent areas 10 and 12 than it supplies, or vice versa.

Depending upon this comparison and computation, the control center 16 transmits signals over telemetering channels 17 and 18 to the apparatus which governs the drive of the alternators 11b and 11c. The alternator 11c in this instance is associated with a reset control 19 which causes the power output of the alternator gradually and smoothly to be changed to keep the tie line transfer power substantially constant despite permanent changes in the proportions of the loads 10d, 11d, 12d. The telemetering channel 17 leads to a transducer and governor 20 which, in turn, controls the prime mover for the alternator 11b. The apparatus 20 provides proportional control action with a fairly rapid response in order to correctively compensate for sudden or abrupt changes in the net power transmitted through the tie lines 14 and 15. The apparatus 20 causes the power output or load of the alternator 11b to be changed very quickly in order to compensate for power surges or changes in the tie lines 14, 15 as the loads 10d, 11d and 12d vary relative to their steady-state or average values.

From the foregoing simplified and brief explanation, it will be seen that the transducer and governor control 20 in FIG. 1 must act quickly in order to change the rate of energy input to the prime mover which drives the alternator 11b, thereby to change quickly the loading or power output of that alternator. Apparatus corresponding to the transducer and governor 20, as well as the alternator 11b (FIG. 1), is here shown in somewhat more detail by FIG. 2.

Referring now to FIG. 2, the alternator 11b is driven by a prime mover illustrated as a hydraulic turbine 25 which receives pressure fluid from a hydraulic pressure head, such as the pen stock of a power dam. The rate of pressure fluid flow through the turbine 25, and thus the rate of energy input, i.e., power input, to the turbine is controlled by a gate valve 26 here schematically shown as opened or closed according to the position of a control member or rack 28 operating on a pinion 29. The rack 28 is adjustably positioned by a hydraulic servo motor 30 comprising a double-acting piston 31 movable in a cylinder 32 having hydraulic lines 34 and 35 communicating with the opposite end portions thereof. The manner in which the servo motor 30 is controlled to position the control element or rack 28 will be described in some detail below. For the present it is sufficient to observe only that the hydraulic servo piston 31 is properly moved and positioned by controlling the admission of pressure fluid from the output 36 of a constant pressure source or pump 38 to the cylinder 32, and the venting of such cylinder to a sump 39. The fluid in the sump 39 and pressurized in the pump output 36 may be, for example, an oil of the type commonly employed in hydraulic controls.

The alternator 11b may be connected to or disconnected from the distribution system or power lines by disconnect switches 40. When the turbine 25 is shut down, these switches will be open, and it is necessary to bring the turbine precisely to synchronous speed which causes the frequency of the alternator output voltage to match the distribution line frequency before the switches 40 are closed. It is to the satisfaction of this synchronizing requirement that the speed governing means are directed.

In order to control precisely the speed of the turbine 25 and alternator 11b, and particularly to bring them to synchronous speed before the switches 40 are closed, means are provided to sense the speed of the alternator and turbine. For this purpose, a first movable member or speed-responsive rod 45 is associtaed with means for displacing it according to the speed of the prime mover 25 and alternator 11b. As here shown, a three phase A.C. tachometer generator 46 is driven from the turbine 25 and is connected by lines 48 to a synchronous motor 49 driving a rotatable collar 50 carrying pivoted flyweights 51. Since the synchronous motor 49 rotates the collar 50 at a speed equal or proportional to the speed of the turbine 25, these flyweights will swing outwardly or inwardly as the speed of the turbine changes, causing inwardly turned ears 51a thereon to depress or release the rod 45 so that the latter moves downwardly or upwardly against or as a result of a biasing spring 52. Thus, the vertical position or displacement of the rod 45 varies according to the speed of the turbine 25.

In order to establish the desired speed which will be automatically maintained by the governor, a second movable member, here shown as a pin 55, is associated with means for displacing it according to the desired speed setting. In the present instance, a bell crank 56 is integrally connected with a manual knob 57 for adjustment to different rotational positions, thus causing the pin 55, which rides within a slot 58 in one arm of the bell crank, to be raised or lowered. A pointer 59 coupled to the bell crank by gearing 60 indicates the approximate speed setting which is selected by rotational positioning of the knob 57.

For imparting a permanent droop characteristic to the governing action, and one which is adjustable in degree, a fourth movable member 61 is associated with means to position it according to the position of the servo motor piston 31 and the gate valve rack 28. As here shown, a restoring cable 62 is rigidly connected at 64 with the piston rod 31a, trained over a pulley 65, and connected to an arcuate sheave 66 rigid with a bell crank 68 mounted on a rotatable shaft 69. A weight 70 suspended by a cable from an arcuate sheave 71 biases the shaft 69 in a clockwise direction. As the servo piston 31 and the rack 28 move to the left or right, and thus open or close the gate valve 26, the cable 62 will cause the bell crank 68 to be rocked clockwise or counterclockwise. Thus, the gate position may be indicated on scales 72 and 74 associated with movable pointers 75 and 76, the first of which is mounted directly on the piston rod 31a and the second of which is fixed to a pinion 78 meshed with a gear segment 79 fixed to the shaft 69. This movement of the shaft 69 and bell crank 68 is transferred into a rocking motion of a cylindrically shaped fulcrum 80 (pivoted to rock about a fixed axis 81) through links 82, 83, 84 and 85. The movable link 61 is pivotally connected at its lower end to a sliding fulcrum or ball 88 disposed within the cylindrical fulcrum 80. If the ball 88 is shifted such that its center is not alined with the fixed pivot 81 of the cylindrical fulcrum 80, then rotation of the latter will result in the member or link 61 being raised or lowered. The ratio of displacement of the control member 28 and the droop link 61 is manually adjusted by turning a knob 90 connected by gear teeth 91 to a disk 92 journaled at 93 and having an eccentric connection 94 to a link 95 which carries the ball 88 at its left end. The degree of "droop" is indicated by a pointer 96 movable with the knob 90, the position of the knob determining the separation of the cylindrical fulcrum pivot 81 and the center pivot connection of the ball 88 to the link 61. Thus it may be considered that the member 61 is a "droop" member which is vertically positioned according to the position of the piston 31 and the control element 28, the ratio between the displacements of the two being adjustable by manually setting the knob 90.

To combine algebraically and with weighted proportions the displacements or positions of the speed-setting pin 55 and the droop member 61, the two are connected to a floating lever 100. As here shown, the pin 55 is rigid with the left end of the lever 100, while the droop member 61 is pivotally connected at 101 to a lever 102 in turn having its left end pivotally connected at 103 to the lever 100. Assuming that the right end 104 of the lever 102 is stationary, the vertical position of a speed-setting, speed-droop, rod 105 will be determined jointly by the vertical positions of the pin 55 and the pin 101. Thus, the member or rod 105 may for the present be considered as a movable member which is positioned according to the algebraic combination of the positions of the speed-setting pin 55 and the droop member 61.

In order to combine the displacements or positions of the speed-responsive rod 45 and the speed-setting droop rod 105, the two are connected to a common floating lever 110. As here shown, the rod 45 is pivoted at 111 to a floating lever 112, although it will be considered for the moment that the left end 113 of the lever 112 remains stationary. Thus, as the speed-responsive rod 45 is moved upwardly or downwardly, a connecting link 114 interposed between the end of the lever 112 and pivotally connected at 114a to the midportion of the lever 110 will be correspondingly moved up or down. The right end 115 of the floating lever 110 (which is pivotally connected to a pilot valve plunger 116) thus assumes a vertical position which depends upon the combined displacements of the speed-responsive rod 45, the speed-setting pin 55, and the droop member 61.

The position of the right end 115 of the floating lever 110 is translated into a corresponding position of the control element 28 by a hydraulic amplifier 120 controlling the servo motor 30. As here shown, such hydraulic amplifier includes pressure fluid and exhaust conduits 121 and 126 leading from the pressure source at 36, and leading back to the sump 39, respectively. The plunger 116 carries a pair of valve lands 116a, 116b which are normally disposed in closing relation over ports 118a, 118b in a bushing 118 slidable in a pilot valve casing 119. The pressure conduit 121 communicates with the interior of the bushing 118 at a point intermediate the lands 116a, 116b while the exhaust conduit 123 communicates with the interior of the bushing at points above and below the lands 116a and 116b. The ports 118a and 118b lead respectively to conduits 122 and 123 which connect with the lower and upper ends of a cylinder 124 containing a valve servo piston 125.

If it is assumed that the floating lever 110 shifts the plunger 116 upwardly so as to make the conduit 122 communicate with the pressure conduit 121 through port 118a, then the land 116b will make the conduit 123 communicate with the exhaust conduit 126 which leads through a chamber 128 to the sump 39. Accordingly, the servo piston 125 will move upwardly. On the other hand, if the plunger 116 is shifted downwardly, the valve lands 116a and 116b will respectively place the conduits 122 and 123 into communication with the exhaust passage 126 and the pressure fluid line 121, so that the servo piston 125 will move downwardly.

The rod of the servo piston 125 is coupled to a bar 130 slidable on a guide 131 and carrying a pin 132 received within the forked end of a feedback lever 134 pivoted at 135. The feedback lever has a projecting part 136 which is engaged with the bushing 118, so that as the plunger 116 is moved upwardly or downwardly, the servo piston 125 will move the sleeve 118 downwardly or upwardly, against the bias of a spring 138. This results in reclosure of the ports 118a and 118b, the servo piston 125 coming to rest in a vertical position corresponding to the vertical position of the plunger 116 and its pivot connection to the floating lever 110.

The servo piston 125 is also connected via a rod 125a to a distributing valve plunger 139 having lands 140 and 141 normally covering ports 140a and 141a in a casing 142 and connected to the conduits 35 and 34 leading to the servo motor cylinder 32. The opposite ends of the cylinder or casing 142 communicate via conduits 144 with the sump 39; the midportion of the cylinder communicates via a conduit 145 with the output of the constant pressure pump 38.

Thus as the distributing valve lands 140 and 141 are shifted upwardly by the servo piston 125, pressure fluid may flow through the conduit 145, the port 140a, and the line 34 to the right end of the servo piston 31, so that the piston 31 moves to the left with fluid being returned from the left end of the cylinder 32 through the conduit 34, the port 141a and the conduits 144 to the sump 39. Conversely, if the servo piston 125 shifts the distributing valve lands 140 and 141 downwardly, then pressure fluid may pass from the pump 38 through the conduit 145, the port 141a and the conduit 34 to the left end of the cylinder 32, thereby causing the servo piston 31 to move to the right, with fluid being returned through the conduit 35, the port 140a and the conduits 144 to the sump 39.

As noted above, upon movement of the servo piston 31 and control element 28, the restoring cable 62 shifts the droop link 61 upwardly or downwardly. This changes the position of the rod 105, thereby rocking the floating lever 110 about its pivot connection at 114a. This changes the positions of the pilot valve plunger 116 and creates a "droop" action which will be explained more fully below.

In order to provide stabilizing or "compensating" action, a compensating member here shown as a rod 150 pivoted at 113 to the floating lever 112 is temporarily displaced in accordance with changes in the position of the control member 28, and then slowly returned to its original position. For this purpose, a connecting link 151 is interposed between the bell crank 68 and a lever 152 fulcrumed at 153. The opposite end of the lever 152 is pivoted at 154 to a rod 155 connected with a dashpot plunger 156 which is slidable but snugly fitting in a partition 158 of a compensating dashpot 159 containing a suitable fluid such as oil. If the main servo piston 31 and the control element 28 are shifted to the left or to the right, then the link 151 will be raised or lowered, and will thus cause the plunger 156 to be lowered or raised, respectively. If this plunger motion is rapid, fluid pressure within the lower compartment of the dashpot 159 will increase or decrease. Accordingly, a smaller plunger 150a rigid with the rod 150 will be shifted upwardly or downwardly against the bias of a double-acting spring 160. This change in pressure within the lower compartment of the dashpot 159 is gradually dissipated, however, by fluid flow through an adjustable orifice formed by a needle valve 162. Thus, after the plunger 150a has been shifted upwardly, for example, it will gradually be restored under the influence of the spring 160 as fluid flow through the adjustable orifice 162 gradually equalizes the pressure in the upper and lower compartments of the dashpot. The reverse action will occur when the plunger 156 is shifted upwardly.

With the foregoing organization of the apparatus in mind, its operation as a speed-controlling governor may now be explained. Assume that the turbine 25 is operating at a desired speed with the alternator 11b connected to a non-synchronous load. The flyweights 51 are being driven by the motor 49 at a corresponding speed. With the system stabilized, the pilot valve plunger 11b, the valve servo motor piston 125, and the distributing valve lands 140 and 141 will be centered and stationary, with the piston 31 stationary at a particular position.

If, now, some disturbance such as abrupt lessening of the loading on the alternator 11b occurs, the speed of the turbine 25 will suddenly increase. The flyweights 51 will swing outwardly, forcing the speed-responsive rod 45 downwardly. Thus, the floating lever 112 pivots about the point 113, shifting the connecting rod 114 downwardly, and swinging the floating lever 110 downwardly about the pivot connection at its left end. The plunger 116 moves downwardly, causing the lands 116a, 116b to uncover the ports 118a, 118b so that the valve servo piston 125 moves downwardly. The feedback connection between the valve servo piston 125 formed by the lever 134 accordingly shifts the valve sleeve or bushing 118 downwardly to reclose the ports 118a, 118b. However, as an incident to downward movement of the servo piston 125, the distributing valve lands 140 and 141 move downwardly to uncover the ports 140a and 141a. Thus, pressure is admitted from the pump 38 through the conduit 145 and port 141a to the left side of the main servo piston 31, causing the latter to move to the right, shifting the control element or rack 28 in a valve-closing direction.

As the gate valve 26 closes, the restoring cable 62 swings the bell crank 68 counterclockwise so that the link 151 and lever 152 shift the larger dashpot plunger 156 upwardly. This decreases the fluid pressure in the lower compartment of the dashpot 159, so that the smaller plunger 150a is drawn downwardly, and a pressure drop is created across the orifice 162. The downward movement of the plunger 150a lowers the left end of the floating lever 112, causing the lever to rock about its pivot connection at 111 and to raise the rod 114. This, in turn, rocks the floating lever 110 upwardly about its left end as a pivot and raises the pilot valve plunger 116. Thus, the valve servo piston 125 starts to move upwardly until again stopped by repositioning of the sleeve 118, this upward movement of the servo piston 125 serving to restore the distributing valve lands 140, 141 in their original positions covering the ports 140a and 141a. Thus, all fluid flow through the pilot valve and distributing valve is terminated with the servo piston 31 having stopped at a position displaced to the left from its original position, and with the gate valve 26 having been closed relative to its original condition. All parts of the apparatus have now been returned to their original or centered positions except the small dashpot plunger 150a, the upper floating lever 112, the speed responsive rod 45 and the flyweights 51. The gate servo motor piston 31 and the large dashpot plunger 156 have assumed new positions corresponding to the new gate valve setting.

As time passes, fluid will flow slowly through the orifice 162 in the dashpot 159. Accordingly, the small dashpot plunger 150a will gradually be returned to its original position by the spring 160, and at about the same rate as the turbine 25 and alternator 11b (which have considerable inertia and time lag) slow down to their original speed. This upward movement of the plunger 150a will occur at about the same rate as the inward movement of the flyweights 51 and the raising of the rod 45. Accordingly, the floating lever 112 pivots about its connection to the rod 114 and does not shift the latter. The dashpot 159 thus "compensates" for the upward movement of the rod 45 as the flyballs return to their original position, i.e., as the speed of the alternator is restored to its original valve.

The same operation will take place, but in the opposite sense, if for any reason the turbine 25 decreases in speed from the desired value established by the setting of the knob 57. Moreover, if the knob 57 is turned to raise or lower the pin 55, this will raise or lower the rod 105, so that the floating lever 110 lowers or raises the pilot valve plunger 116. The same action described will take place until the speed of the turbine 25 is matched to the setting of the pin 55.

The foregoing operational summary purposely omitted reference to the action of the droop member 61. That is, it was assumed that the ball fulcrum 88 was alined with the pivot 81 for the cylindrical fulcrum 80, so that movements of the control member 28 produced no movements of the droop link 61. This would be true if the adjustment rod 90 was set to the zero droop position, resulting in isochronous control.

With the knob 90 adjusted to some position other than zero droop, however, as the control element 28 moves to the left or right, the link 61 and its pivot connection 101 to the lever 102 will move upwardly or downwardly, thereby swinging the floating lever 100 about the pin 55 as a fulcrum, and causing the rod 105 to change the position of the left end of the floating lever 110. The sense of this action is such that as the servo piston 31 moves to the left or right, the apparatus comes to equilibruim with the turbine 25 running at a lower or higher speed, respectively. Assuming that the alternator is connected to a non-synchronous load, the speed will "droop" or decrease as the load is increased. This "permanent droop" action becomes important when the alternator 11b is connected by closure of the switches 40 to a large distribution system which creates synchronizing torque to prevent speed changes in the alternator 11b and turbine 25. This will be more fully explained below.

As indicated above, it is necessary precisely to control the speed of the turbine 25 and alternator 11b when the latter is disconnected from the distribution system. Manual adjustment of the speed-setting knob 57 must afford setting of the turbine to a speed which makes the alternator frequency and phase match the frequency and phase of the distribution system before the switches 40 are closed. However, once such synchronization has been effected and the switches 40 have been closed to connect the alternator to the line, then the alternator is subjected to synchronizing torque. If the turbine 25 tends to speed up, more output current is produced by the alternator 11b, increasing its reactive torque on the turbine 25 and preventing an increase in the speed of the latter. Conversely, if the turbine 25 tends to slow down, the alternator 11b supplies less current to the distribution system, reducing the torque load on the turbine 25 so that it continues at the original speed. Thus, it may be considered by way of simplification that the speed of the alternator 11b is fixed due to synchronizing torque once the switches 40 have been closed to connect it to a large synchronous distribution system.

Under these conditions, changes in the position of the servo piston 31 and the control member 28 to increase or decrease the opening of the gate valve 26 will increase or decrease the power input to the turbine 25. Since the speed of the latter is fixed, the torque supplied to the alternator 11b will increase or decrease, causing the latter to supply more or less current to the distribution system. The current output or load carried by the alternator, rather than its speed, is determined by the position of the control member 28 when the alternator is connected to the distribution system.

In a large integrated distribution system, such as that represented by the three areas 10, 11, 12 interconnected by tie lines 14, 15 (FIG. 1), the problem exists of controlling the several alternators so that they properly divide the total load even though the demands of the individual load portions 10d–12d change rapidly relative to one another. With a given droop setting, changes in the speed setting for a governor will cause corresponding changes in the position of the control member and corresponding changes in the output current or load the governed alternator. But once the speed and droop settings have been established for the governor controlling a particular alternator, then its loading is fixed, and all permanent load changes must be assumed by the particular alternators in the distribution system which are operating with isochronous governing action.

As explained above with reference to FIG. 1, there is a need to be able rapidly to change the loading on a governed alternator in order quickly to compensate for changes in the demands of the distribution system. In the example given, the net tie line transfer of power to or from the distribution area 11 is to be held substantially constant, even though the several loads of different interconnected areas vary abruptly, by changing the load carried by the alternator 11b.

In accordance with the present invention, the governor apparatus illustrated in FIG. 2 includes means responsive to a control signal for rapidly adjusting the rate of energy input to the turbine 25, and thus the power output or load of the alternator 11b. The control signal may be derived from a telemetered signal such as that transmitted by the control center 16 (FIG. 1) and will cause the servo piston 31 to be repositioned rapidly in order to decrease or increase the loading or power output of the alternator 11b when that is required.

Referring to FIG. 2, the rapid load-changing means are here shown as comprising a transducer 170 responsive to a variable electric signal received on input terminals 171 to position correspondingly an output member 172, which may be considered as a third movable member of the apparatus. With the closure of a switch 175, the input terminals 171 are connected to the output of an amplifier 176 and a telemetering receiver 178 adapted to receive, for example, telemetered signals transmitted over the channel 17 (FIG. 1). The telemetering receiver 178 and the amplifier 176 together produce a direct current signal which varies with the net tie line transfer power.

In order to convert the variable direct current signal into a corresponding displacement of the output member 172, the terminals 171 lead to a pair of solenoid windings 179 disposed on opposite sides of an annular partition 180 within a housing 181 made of ferromagnetic material. Centrally disposed within the windings 179, and movable vertically within the central opening of the partition 180, is an armature 182 having its opposite axial ends permanently magnetized to represent opposite magnetic poles.

The windings 179 are connected in series bucking relation between the terminals 171, so that with input current of one polarity or the other, a force in an upward or downward direction will be exerted on the armature 182, such force being proportional in magnitude to and agreeable in sense with the current received over the terminals 171.

The armature 182 is engaged at its upper surface with a compression spring 183 which reacts against an adjusting thumb screw 184, the latter affording calibration adjustments. The spring biases the armature so that there is a zero offset, i.e., the force on the armature is zero even when there is appreciable current in the windings 179 which urges the armature upwardly.

Connected with and extending beneath the armature 182 is a plunger 185 having a pilot valve land 186 normally covering a port 188 in a casing 196. Pressure fluid is normally supplied from the output 36 of the pump 38 through a lower chamber 190 in an auxiliary valve 191 which will be described in more detail below. The valve 191 is a solenoid valve shown in its deenergized condition, but for the present it should be assumed that the valve is energized and its plunger shifted upwardly from the position shown. For the present it need only be noted that pressure fluid from the lower chamber 190 may pass upwardly through a central opening 191a in a valve stem carrying a land 192 to enter a conduit 194 which communicates with the cylinder 195 above the pilot valve land 186.

The pressure fluid control 194 also extends through the casing 196 to the upper end of a cylinder 198 containing a piston 199 rigid with the output member 172. Still further, the conduit 144 which leads to the sump 39 communicates through the casing 196 to a chamber 200, such chamber being placed in communication with the port 188 when the pilot valve land 186 is raised from the position illustrated.

The armature plunger 185 terminates in a disk 202 bearing on a restoring compression spring 204 engaged with a large rod 203 integral with the piston 199. The piston 199 is movable vertically within the cylinder 198, and owing to the fact that it has a smaller effective area on its upper side constantly receiving fluid at the source pressure, it will move upwardly or downwardly as the pressure exerted on its larger area lower side is made greater or less than some pressure lower than the source pressure. The port 188 communicates through an orifice formed by an adjustable needle valve 205 and a passage 206 with the lower end of the cylinder 198.

Assume that the current supplied over the terminals 171 to the windings 179 increases from one value to another, and thus exerts an increased upward force on the armature 182. The plunger 185 rises so that the land 186 places the port 188 in communication with the chamber 200 and the exhaust conduit 144. Under these circumstances, fluid may flow from the lower end of the cylinder 198 through the passage 206 and the needle valve 205, through the port 188, and thence to the sump 39. Moreover, pressure fluid may pass through the conduit 194 to the upper end of the cylinder 198, so that a net downward force is exerted on the piston 199. Accordingly, the piston 199 and the connected output member 172 will move downwardly, and such movement will continue until the spring 204 is sufficiently relaxed that its upward force on the plunger 185 is reduced sufficiently to cause the valve land 186 to return to its original position in closing relation to the port 188.

On the other hand, if the current supplied over the terminals 171 to the windings 179 decreases, the upward force magnetically exerted on the armature 182 is decreased. The spring 183 moves the plunger 185 downwardly, thereby placing the port 188 in communication with the pressure conduit 194. Under these circumstances, pressure fluid flows through the conduit 194, the port 188, the needle valve orifice at 205, and the passage 206 to the underside of the piston 199. Since the pressure on the underside of the piston 199 will approach that on the upper side, and since the underside of the piston has a greater area, the piston 199 will move upwardly, taking the output member 172 with it. As the piston 199 is raised, however, the spring 204 is compressed so that it exerts a greater upward force on the plunger 185. When the spring force becomes sufficient, the valve land 186 will be raised back into closing relation with the port 188 so that the piston 199 and the output member 172 come to rest.

From the foregoing, it will be seen that the position of the output member 172 is changed according to the changes in the current supplied over the terminals 171 to the transducer windings 179.

In order to cause this positioning of the member 172, which corresponds to the magnitude of the variable input signal, to correspondingly change the position of the control member 28 and the loading of the alternator 11b, the displacement of the member 172 is superimposed upon the displacements of the speed-setting member or pin 55 and the droop member or link 61. For this purpose, the displacements of the member 172, 61 and 55 are algebraically combined with weighted proportions to produce the net displacement of the rod 105. As here shown, the member 172 is pivotally connected at 210 to a floating lever 211 fulcrumed at 212 and pivotally connected at 104 to the lever 102. This arrangement of interconnected levers is employed as a means to algebraically combine in weighted relation the displacements of the movable speed-setting pin 55, the movable droop link 61, and the transducer output member 172. Assuming that the pin 55 and link 61 remain stationary, as the transducer output member 172 moves upwardly or downwardly, the lever 211 rocks the lever 201 clockwise or counterclockwise about the pivot 101 as a fulcrum. This in turn will cause the lever 100 to rock upwardly or downwardly about the pin 55 as a fulcrum, thereby raising or lowering the rod 105, and causing the floating lever 110 to swing about the pivot connection 114a, thereby lowering or raising the plunger 116 of the pilot valve 120. This movement of the valve plunger 116, as previously noted, causes the distributing valve 139 to move the main servo piston 31 in a gate closing or opening direction.

If the transducer output member 172 moves upwardly or downwardly to a new permanent position (in response to a decrease or increase in the control signal), the initial effect is the change in the position of the rod 105 so that the distributing valve 139 is opened to run the servo piston 31 in a gate closing or opening direction. However, as the servo piston 31 moves in a gate closing or opening direction, the restoring cable 62 acts through its connection to the droop fulcrum 80 to lower or raise the link 61. This, in turn, rocks the lever 102 downwardly or upwardly about the point 104 as a fulcrum, causing the floating lever 100 to be raised or lowered, respectively, about the pin 55 as a fulcrum. Thus, the floating lever 110 will be restored to its original position and the distributing valve 139 centered, so that the servo piston 31 comes to rest in a new position.

From the foregoing, it will be seen that when the alternator 11b is connected to the distribution line, the position of the transducer output member 172 will be determined by the magnitude of the variable current supplied to the input teminals 171, and the position of the servo piston 31 and the control member or rack 28 will vary directly with the position of the transducer output member 172, owing to the action of the droop means. As the control signal or current supplied to the transducer windings 179 increases or decreases, therefore, the opening of the gate valve 26 will be increased or decreased, and the loading or output current of the alternator 11b will be increased or decreased.

The compensating means also come into play whenever the control signal and the position of the output member 172 change abruptly. For when this occurs, the main servo piston 31 moves rapidly, so that the link 151 rapidly displaces the dashpot plunger 156. Accordingly, the plunger 150a is momentarily displaced and then gradually restored to its original position. Since the speed is constant and the speed-responsive rod 45 stationary, the movements of the plunger 150a will rock the floating lever 112 about the pivot at 111, thereby momentarily displacing the rod 114 and then restoring it to its original position. As a result of this compensating action applied through the rod 114 to the floating lever 110 and combined with the displacement of the rod 105, the valve plunger 116 and distributing valve 139 are centered more quickly, so as to lessen the possibility of overshoot and hunting of the servo piston 31.

The foregoing operation in response to a change in the magnitude of the control signal or current takes place very rapidly. With the present arrangement it is possible to change the output current produced by the alternator 11b by a fairly large percentage in a very short time. This is highly desirable in order to prevent transient deviations in the net tie line transfer of power. Simply by way of example, in one embodiment of the present invention, the transducer output member 172 can move over its full range of travel in a minimum time of 0.1 second. The pilot valve plunger 116 is moved with corresponding speed, and only a slight delay is involved in the main servo piston 31 reaching its new position.

While it is desirable that the response of the transducer 170 to changes in the control signal be very rapid, there are in some instances practical limitations on this response speed. Accordingly, it is desirable to be able to adjust the speed of response of the transducer 170 in order to make its operation just as fast as is acceptable to the remaining portions of the equipment being controlled.

It is for this purpose, that the needle valve 205 is employed. Since the restriction presented by that needle valve may be adjusted, the time required for fluid to flow into or out of the lower end of the cylinder (and restore the valve land 186 after an initial displacement) may be changed. Simply by adjusting this needle valve the speed of the output member 172 in reaching its new position for a given change in the magnitude of the control signal may be varied. And it is but a simple matter to adjust the needle valve in order to make the speed of response of the main servo piston 31 as fast as is practical, yet not so fast as to create undesirable effects.

In accordance with another important feature of the present invention, means are provided to lock the transducer output member 172 against movement in the event that the control signal supplied to the transducer 170 suddenly disappears. Consider, for example, that the alternator 11b is operating under steady-state conditions at 75 percent of its rated load, the control signal supplied to the transduced having a corresponding value. If suddenly the control signal should disappear, due to some failure in the transmission channel or communication equipment, then the transducer output member 172 would move quickly to a new position corresponding to a zero input signal, and cause the servo piston 31 to move the control member or rack 28 in a gate-closing direction. This would result in the alternator 11b dropping substantially all of the load that it was previously carrying, a condition which is not required or desired since the distribution system loads have not changed appreciably. Since dropping of substantially all of the load previously carried by the alternator 11b might create serious disturbances in the generation system, and possibly cause overloading of other alternators, this effect is to be avoided.

In accordance with the present invention, the transducer output member 172 is rigidly locked against movement by supplying pressure fluid to a passage 215 leading to a locking piston 214 disposed at right angles to the transducer piston 199. With the solenoid valve 191 deenergized and its land 192 in the position illustrated, the passage 215 receives pressure fluid from the source conduit 36 of the pressure source or pump 38 through the passage 191a. Accordingly, the locking piston 214 is urged inwardly against the piston 199, and the latter is locked against movement. The land 193 also closes the conduit 194 leading to the pilot valve chamber 195.

The plunger for the valve 191 carries an armature 218 disposed within a solenoid 216 and is biased downwardly by a spring 217. The solenoid 216 is connected through normally open relay contacts 224 to a suitable voltage source represented at 225. The contacts 224 are closed in response to energization of an associated relay coil 226, which in the present instance is connected across the input terminals 171 of the transducer 170.

The operation of this arrangement is such that the piston 214 is urged into locking engagement with the piston 199 whenever there is no input signal applied to the terminals 171. During normal operation with the switch 175 closed, the terminals 171 have an input current and voltage applied thereto. Accordingly, the relay coil 226 is energized and the contacts 224 are closed to excite the solenoid 216 which thus exerts an upward force on the armature 218, shifting the land 193 upwardly from the position shown. This cuts off pressure fluid from the passage 215, so that the locking piston 214 does not prevent movement of the piston 199. Thus, whenever a signal is present on the terminals 171, the relay 226 will be energized and the locking piston 214 released.

If for any reason there should be no voltage and current applied to the transducer input terminals 171, then the relay coil 226 will be deenergized, the contacts 224 opened, and the solenoid 216 deenergized. Under these circumstances, the biasing spring urges the plunger of the control valve 191 downwardly so that the land 193 shuts off the conduit 194 leading to the valve chamber 195, and so that pressure fluid flows from the pump output conduit 36 through passage 191a and the conduit 215 to the locking piston 214. The locking piston 214 will be urged to the left and into firm locking engagement with the piston 199.

In the present arrangement, the control signal produced by the receiver 178 and the amplifier 176 has a suppressed zero, i.e., when there is no load on the alternator 11b, the control signal does have some finite value. Increases in the load of the alternator are indicated by increases in the control signal above this finite value. Even though the control signal indicates "no load" on the alternator, the relay 226 and the solenoid 216 will remain energized. Adjustment of the screw 184 changes the position of the output member 172 and the loading on the alternator 11b for a given value of the control signal or current.

In keeping with another aspect of the invention, the output member of the load-controlling transducer 170 may be automatically locked or unlocked as an incident to the alternator 11b being disconnected from or connected to the distribution system. As here shown, by way of example, the disconnect switches 40 are ganged through a mechanical, hydraulic or electrical control connection 230 to the switch 175. When the alternator 11b is disconnected from the distribution line, therefore, the switch 175 will be open, and the relay coil 226 will be deenergized. This deenergizes the solenoid valve 191 and results in pressure fluid being applied to the locking piston 214. Thus, the output member 172 cannot move, the floating lever 211 must remain stationary, and the lever 102 may swing about the point 104 as a fulcrum.

When, however, the switch 40 is closed to connect the alternator 11b to the distribution line, the connection 230 also closes the switch 175. Under these circumstances, the input terminals 171 receive the variable control signal produced by the telemetering receiver 178 and amplifier 176, so that the relay 226 is energized and the locking piston 214 released. The armature 182 and the piston 199 are thus free to move vertically and change the position of the output member 172 in accordance with the magnitude of the received control signal. With the equipment thus operating, and even though the switch 175 remains closed, if the control signal should appear, for example due to a failure in the telemetering receiver 178, then the relay coil 226 will be deenergized, the solenoid valve 191 deenergized, and fluid pressure supplied to the locking piston 214 so that the output member 172 will thereafter remain stationary, causing the alternator 11b to continue in operation carrying the load which it had been carrying prior to the interruption in the control signal.

From the foregoing operational description of the present invention, it will be seen that the governing apparatus in the first instance provides accurate and fast control in the speed of the turbine 25 and alternator 11b when the latter is disconnected from the distribution system. This permits fast and convenient synchronizing of the alternator to the frequency of the distribution system before the switches 40 are closed. Once the alternator is connected to the distribution system, its loading is controlled in accordance with a variable control signal supplied to the input terminals 171 of the transducer 170. As the control signal varies in magnitude, the loading of the alternator 11b is rapidly and correspondingly varied so as to keep the division of total load between several alternators, or between several interconnected power systems, in a desired relation.

While the transducer 170 produces rapid changes in the loading of the alternator 11b, the speed of response can be adjusted by the simple expedient of changing the setting of the needle valve 205. This changes the metering orifice and adjusts the speed at which the transducer piston 199 moves in response to a given change in the control signal. The speed of movement of the servo piston 31 and the gate valve control member 28 may thus conveniently be adjusted so that it is rapid, but not so rapid as to produce undesirable effects.

Finally, the present arrangement is one in which failure of the apparatus which produces the control signal does not result in serious disturbances. For under those conditions, the transducer output member 172 is "frozen" and the alternator 11b must continue to carry the load which it previously had.

I claim as my invention:

1. In a system having a movable control member and means for controlling according to the position of such member the rate of energy input to a prime mover, the combination comprising a first movable member and means for displacing it according to the speed of the prime mover, a second movable member and means for displacing it according to a desired speed-setting, a third movable member and means for moving it according to changes in a variable control signal, a fourth movable member and droop means for displacing it according to the position of said control member, a fifth movable member and compensating means for temporarily displacing it in accordance with changes in the position of said control member and then causing it slowly to return to its original position, and means for positioning said control member according to a weighted algebraic combination of the displacements of the said five movable members.

2. The combination set forth in claim 1 further characterized in that said means responsive to the variable control signal for displacing said third member includes an adjustable time delay means for setting the rate at which said third member moves in response to a given change in said control signal.

3. The combination set forth in claim 1 further characterized in that said means responsive to a control signal cause the steady-state displacement of said third member to be proportional to the steady-state magnitude of said signal.

4. The combination set forth in claim 1 further characterized by means for locking said third member against movement in the absence of a control signal applied to the means associated with said third member.

5. In a system having a movable control member and means for controlling according to the position of such control member the rate of energy input to a prime mover driving an alternator, the combination comprising a first movable member and means for displacing it according to the speed of the prime mover, a second movable member and means for displacing it according to a desired speed-setting, a third movable member and means for displacing it according to a variable control signal, a fourth movable member and droop means for displacing it according to the position of said control member, a fifth movable member and compensating means for temporarily displacing it in accordance with changes in the position of said control member and then causing it slowly to return to its original position, a sixth movable member and means for displacing it according to an algebraic combination of the displacements of said first and fifth members, a seventh movable member and means for displacing it according to an algebraic combination of the displacements of said second, third and fourth members, an eighth movable member and means for displacing it according to an algebraic combination of the displacements of said sixth and seventh members, and means for positioning said control member according to the displacement of said eighth member.

6. The combination set forth in claim 5 further characterized in that said means for displacing said third member comprises a servo transducer including a movable input element and means to exert a control force thereon proportional to the variable control signal, a movable output element and means to move the same in a direction corresponding to the displacement of said input element from a neutral position, and feedback means controlled according to the position of said output element for exerting a counterbalancing force to restore said input element to neutral, and adjustable means for determining the rate at which said output element moves for a given displacement of said input element.

7. The combination set forth in claim 5 further characterized by means for locking said third member against movement in the absence of a control signal applied to said means associated with said third member.

8. In a governor for controlling the rate of energy supplied to a prime mover driving an alternator connectable to a distribution system, such governor including a movable speed-responsive member, a movable speed-setting member, and a movable droop member all interconnected to adjust the position of a control member which by its position determines the rate of energy input to the prime mover, the combination comprising an electromechanical transducer having means to position a movable member according to changes in the magnitude of an electric control signal, and means for superimposing the movement of said transducer member on the movement of said speed-setting and droop members, so that when the alternator is connected to the distribution system its loading is varied rapidly according to the magnitude of the control signal.

9. In a governor for controlling the power input to a prime mover driving an alternator connectable to a distribution system, such governor including a compensated movable speed-responsive member, a movable speed-setting member, and a movable droop member all interconnected to position a control member, and means for controlling the power input to the prime mover according to the position of said control member, the improvement which comprises, in combination, a transducer having a movable output member and means for positioning said output member according to the magnitude of a variable control signal, and means for superimposing the movement of said transducer output member on the movements of said speed-setting and droop members so that the loading of the alternator when connected to the distribution system is rapidly varied in accordance with the control signal received by said transducer.

10. The combination set forth in claim 9 further characterized by means for locking said output member in the absence of a control signal applied to said transducer.

11. In a governor for controlling the power input to a prime mover driving an alternator connectable to a distribution system, such governor including a compensated movable speed-responsive member, a movable speed-setting member, and a movable droop member all interconnected to position a control member, and means for controlling the power input to the prime mover according to the position of said control member, the improvement which comprises, in combination, a transducer having a movable output member and means for positioning said output member according to the magnitude of a variable control signal, adjustable means for changing the speed at which said output member moves from one position to another in response to a given change in the control signal, means for locking and unlocking said output member against movement when the alternator is respectively disconnected from and connected to the distribution system, and means for superimposing the movement of said transducer output member on the movements of said speed-setting and droop members so that the loading of the alternator when connected to the distribution system is rapidly varied in accordance with the control signal received by said transducer.

12. In a governor for a prime mover and having means to vary the power input to the prime mover in accordance with the position of a movable control member, said governor having speed-setting, speed-responsive, compensating and droop members which by their movements jointly control the movements of said control member, the combination comprising an electromagnetic transducer having a coil and a movable armature cooperatively associated therewith to produce a force on the armature directly related to the magnitude of an electric current supplied to the coil, an hydraulic force-to-position transducer having a value controlled by said armature and an output piston movable to positions related to the force on said armature, means for superimposing the movements of said output piston on the movements of the speed-setting member, an auxiliary locking piston movable transversely to said output piston and engageable with the latter to lock it against movement, valve means for supplying pressure to said locking piston, and control means to operate said valve means and cause said locking piston to engage said output piston in response to the absense of electric current being supplied to said coil.

13. In a governor for controlling the rate of energy supplied to a prime mover, such governor including a movable speed-responsive member, a movable speed-setting member and a movable droop member all interconnected to adjust the position of a control member which by its position determines the rate of energy input to the prime mover, the combination comprising an electromechanical transducer having means to position a movable member according to changes in the magnitude of an electric control signal, means for superimposing the movement of said transducer member on the movement of said speed-setting and droop members, means for locking said transducer member against movement, and means for selectively actuating and deactuating said locking means.

14. In a governor for controlling the rate of energy supplied to a prime mover, such governor including a movable speed-setting member and a movable speed-responsive member positioned in accordance with the speed of the prime mover, and a control member which by its position determines the rate of energy input to the prime mover together with means for moving said control member in accordance with the movements of said speed-setting and speed-responsive members, the combination comprising an electromagnetic transducer having a movable output member and means to position the same according to the magnitude of an electric control signal, means for combining the movements of said speed-setting and output members so that the two jointly effect the position of said control member, means for locking said output member against movement, and condition responsive means for releasing and actuating said locking means.

References Cited in the file of this patent
UNITED STATES PATENTS
2,178,355      Brunner _____ Oct. 31, 1939